Patented Jan. 12, 1954

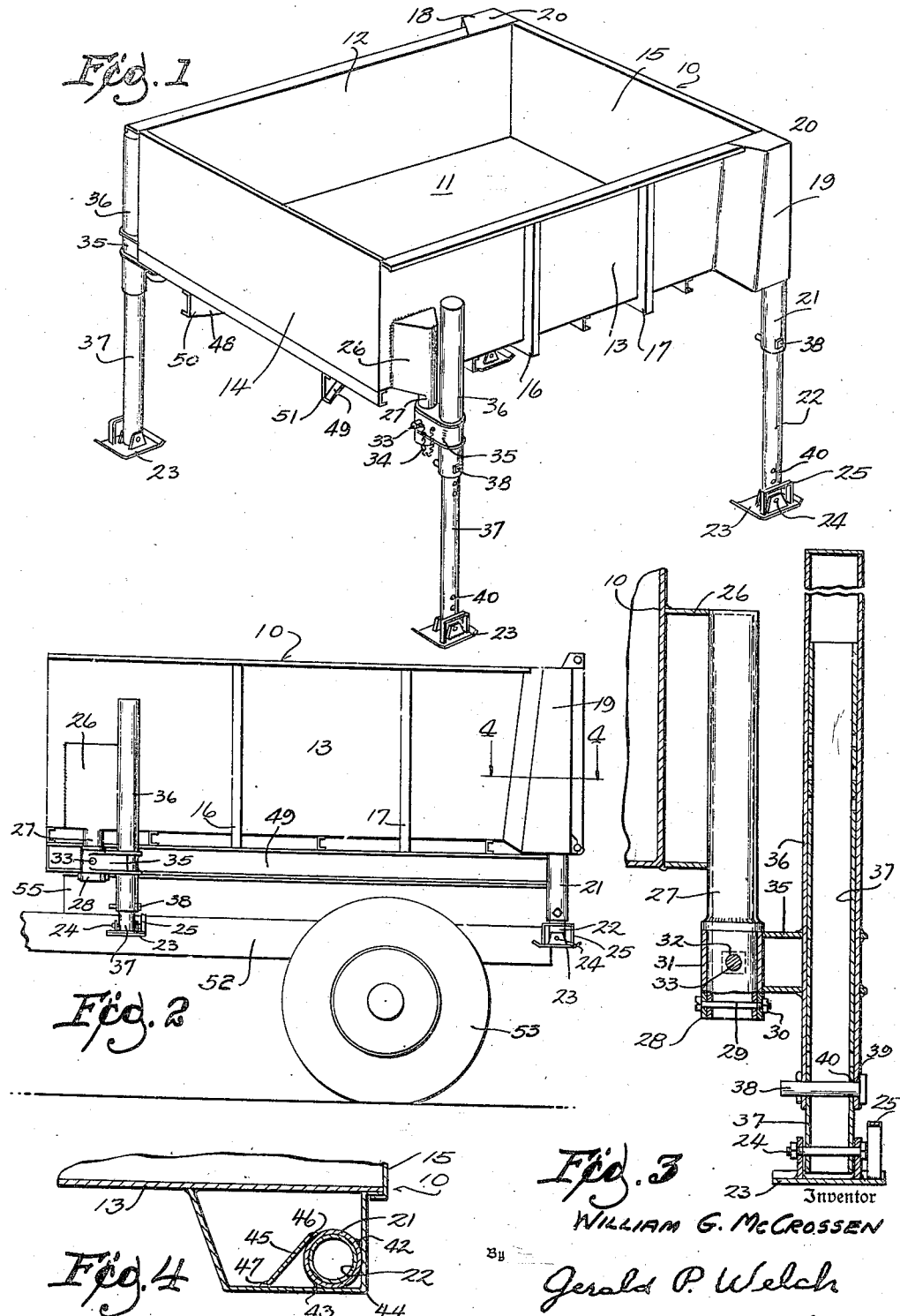

2,665,938

UNITED STATES PATENT OFFICE 2,665,938

DEMOUNTABLE TRUCK BODY

William G. McCrossen, West Allis, Wis.

Application July 24, 1950, Serial No. 175,519

2 Claims. (Cl. 296—28)

1

This invention relates to improvements in demountable truck bodies, and more particularly to novel demountable truck bodies having retractable standards and is related to my patent application bearing the Serial #160,754, filed May 8, 1950, for Improvements in Methods of Load handling, in that it involves one form of demountable truck body employed therein.

In trucking practice, it has been found that one mobile unit may advantageously be employed in connection with several truck bodies provided with retractable standards so that a mobile unit may be backed under the body while it rests on its standards after which the standards may be retracted and the body secured to the mobile unit and transported with its load. After such body has been dumped of its contents it may be returned to a loading site, the standards may be extended, and the mobile unit may be driven clear of the body which can be left at said site for convenient loading thereof and the mobile unit may be driven away to handle similar demountable bodies.

An object of the invention is to provide a demountable body with retractable standards having special features of construction which permit easy backing thereunder of a mobile unit.

Another object of the invention is to provide a device of the type which will effect economies in trucking operations by reason of the fact that a plurality of the bodies may be used in connection with a single mobile unit.

Other and further objects of the invention will appear as the description proceeds, reference being had to the accompanying drawing, in which:

Fig. 1 is a view in perspective from above of a demountable truck body shown in position for loading with the retractable standards thereof in extended position supporting said body.

Fig. 2 is a side view of said body in position on a mobile unit with the standards thereof in retracted position.

Fig. 3 is a vertical sectional view through one of the front end standards of the device.

Fig. 4 is a view on line 4—4 of Fig. 2.

Referring more particularly to the drawing, the numeral 10 represents the device generally having a bottom 11, side walls 12 and 13, and end walls 14 and 15. The body 10 is provided with the transverse and vertical ribs 16 and 17 disposed exteriorly of the bottom 11 and side walls 12 and 13. A pair of trunk members 18 and 19 are formed at the rear corners of the body 10. Each trunk 18 and 19 has a top wall 20 and contains a downwardly projecting sleeve 21 open at its lower end to receive the telescopic standard element 22 which is provided with a surface conforming foot 23 pivoted at 24 of said standard. Each foot 23 has a hand strap 25 for manually retracting the telescopic standard 22. Each side wall 12 and 13 is provided adjacent the front end 14 with a bracket member 26 having a downwardly disposed tubular spindle 27 which has a lower retaining collar 28. The spindle 27 and the collar 28 are apertured to accommodate the retaining bolt 29. The bolt 29 is secured by the nut 30 exteriorly of said collar 28. A sleeve 31 is held for free rotation on the spindle 27 by means of the collar 28 and the bolt 29. The sleeve 31 and the spindle 27 are apertured as at 32 to accommodate a pin 33 retained on a flexible chain 34. The pin 33 is used to fix the sleeve 31 against rotation on the spindle 27. A tubular arm 35 is fixed to the sleeve 31 and to the standard receiving sleeve 36 on the outer end of said arm 35. The standard 37 is shown in Fig. 3 in raised position within the sleeve 36 and retained in this position by the pin 38 which is inserted through an aperture at 39 of the sleeve 36 and a registering aperture as at 40 of the standard 37. In Fig. 4 it will be seen that the sleeve 21 is welded at points 42 and 43 interiorly of the rear outer corner 44 of the truncated element 19 and that a brace plate 45 is welded at 46 to said sleeve 21 and at 47 to the outer wall of the trunk element 19.

A pair of guide rails 48 and 49 flared outwardly at their frontal ends 50 and 51 are subjoined to the bottom 11 of the body 10.

As shown in Fig. 1 the standards 22 and 37 are extended and are held in position by pin 25 inserted through apertures in the sleeve 21 and the standard 22. The arm 35 has been swung outwardly of the body 10 and has been fixed by means of the pin 33. A mobile unit 52 may be backed under the body 10 and the wheels thereof 53 will thus clear the standards 37 in their laterally extended positions. The guides 48 and 49 will receive the lift frame 55 of the mobile unit. After the lift frame 55 on the mobile unit 52 has been raised a short distance, the standards 37 and 22 can be raised manually and secured in the lifted position by means of the pins 38 inserted through the apertures as at 40. The body 10 may then be lowered to a carrying position on the mobile unit 52. This process is reversed when the body 10 is placed for the reception of a load.

It will be understood that the device is capable of many modifications in structure and design, without departing from the spirit of the invention, within the scope of the appended claims.

Having thus described the invention, what is claimed and desired to be secured by Letters Patent of the United States, is:

1. In a box truck body, an exterior laterally projecting bracket, a tubular element extending vertically downwardly therefrom, a cylindrical bearing adjacent the lower end of said tubular portion, a sleeve element embracing said bearing, an arm rigidly connecting said sleeve with an inverted tubular socket, a tubular standard movable freely within said socket, the said socket and standard each having horizontally aligned apertures, and pin means for relatively fixing the standard in selected positions in said socket.

2. In combination with a box truck body, an exterior laterally projecting wall bracket thereon, a tubular element extending vertically downwardly from said bracket, an integral cylindrical bearing adjacent the lower end of said tubular portion, a sleeve element embracing said bearing, shoulder means on said tubular portion for restraining vertical movement of said sleeve, an inverted tubular socket, an arm rigidly connecting said sleeve with said socket, a tubular standard movable freely within said socket, the said socket and standard each having a plurality of horizontally aligned apertures, pin means for relatively fixing said socket and standard, and a foot element at the base of the standard comprising a base plate, a plurality of spaced vertical plates fixed on the upper surface thereof, and an axle journalled in said vertical plates and horizontally through the lower end of said tubular standard.

WILLIAM C. McCROSSEN.

References Cited in the file of this patent

UNITED STATES PATENTS

| Number | Name | Date |
|---|---|---|
| 1,122,686 | Clark et al. | Dec. 29, 1914 |
| 1,290,694 | Angle | Jan. 7, 1919 |
| 1,303,854 | Clark | May 20, 1919 |
| 1,316,735 | Olds | Sept. 23, 1919 |
| 1,394,737 | Keesler | Oct. 25, 1921 |
| 1,508,183 | Hallowell | Sept. 9, 1924 |
| 1,838,795 | Thompson | Dec. 29, 1931 |
| 2,383,192 | Heil | Aug. 21, 1945 |
| 2,517,304 | Greening | Aug. 1, 1950 |